United States Patent [19]
Orbach et al.

[11] Patent Number: 6,058,342
[45] Date of Patent: *May 2, 2000

[54] PRECISION CONTROL OF IMPLEMENT POSITION/MOTION

[75] Inventors: Abraham Orbach, Naperville; William L. Schubert, Downers Grove, both of Ill.

[73] Assignee: Case Corporation, Racine, Wis.

[*] Notice: This patent is subject to a terminal disclaimer.

[21] Appl. No.: 08/685,822

[22] Filed: Jul. 25, 1996

[51] Int. Cl.[7] .............................. A01B 41/06; G06F 7/70
[52] U.S. Cl. ..................................... 701/50; 172/2; 172/8
[58] Field of Search .................................. 701/50; 172/2, 172/3, 4, 7, 8, 9, 10, 4.5; 364/167.01, 148

[56] References Cited

U.S. PATENT DOCUMENTS

| | | | |
|---|---|---|---|
| 4,385,353 | 5/1983 | Schneider | 701/50 |
| 4,518,044 | 5/1985 | Wiegardt et al. | 701/50 |
| 5,019,983 | 5/1991 | Schutten et al. | 701/50 |
| 5,040,119 | 8/1991 | Hardy et al. | 172/4 |
| 5,143,159 | 9/1992 | Young et al. | 701/50 |
| 5,261,495 | 11/1993 | Szymczak | 172/4 |
| 5,320,186 | 6/1994 | Strosser et al. | 701/50 |
| 5,339,906 | 8/1994 | Fox et al. | 172/4 |
| 5,421,416 | 6/1995 | Orbach et al. | 701/50 |
| 5,467,829 | 11/1995 | Barton et al. | 701/50 |
| 5,469,921 | 11/1995 | Orbach et al. | 701/50 |
| 5,472,056 | 12/1995 | Orbach | 701/50 |
| 5,505,267 | 4/1996 | Orbach et al. | 701/50 |
| 5,549,166 | 8/1996 | Orbach et al. | 701/50 |
| 5,560,431 | 10/1996 | Stratton | 701/50 |
| 5,684,691 | 11/1997 | Orbach et al. | 701/50 |
| 5,810,095 | 9/1998 | Orbach et al. | 701/50 |

*Primary Examiner*—Jacques H. Louis-Jacques
*Attorney, Agent, or Firm*—Foley & Lardner

[57] ABSTRACT

A system for controlling a function of a machine system including an off-road work vehicle, a moveable device, and a positioning assembly including an actuator for moving the device in response to a control signal. The system includes an operator-adjustable input device which generates an input signal, and a control circuit which generates the control signal for moving the moveable device in a first or a second manner depending upon the rate of change of the input signal. The first manner is selected when the input signal changes slowly, and the second manner is selected when the input signal changes quickly. The system may include a sensor for sensing a parameter of the machine system and a command device for generating a command signal. A control signal is generated based at least upon the difference between the sensed parameter and command signals. Also disclosed is a system for controlling the elevation of an implement carried or trailed by a work vehicle. An implement positioning assembly includes an actuator for raising and lowering the implement in response to a control signal. The control signal is generated in a first manner when the command signal changes slowly, and in a second manner when the command signal changes quickly. An input device can also be used to override the normal rate of movement of an actuator with a slower value.

12 Claims, 5 Drawing Sheets

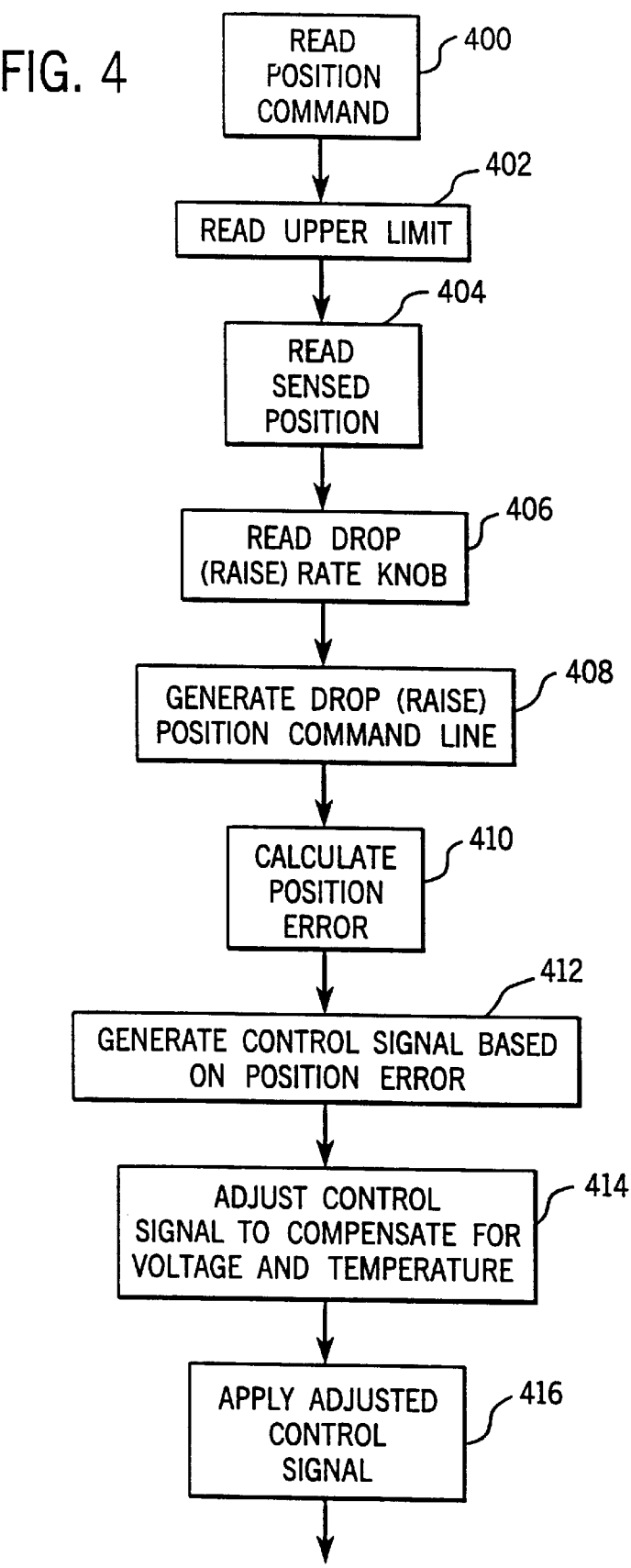

PRECISION CONTROL OF IMPLEMENT POSITION/MOTION

FIELD OF THE INVENTION

The present invention relates generally to the field of control systems for off-road work vehicles. More particularly, the invention relates to a system for controlling a function of a machine system, the machine system including a moveable device adapted to perform the function when moved by a positioning assembly including an actuator, wherein an operator can adjust an input device to control the moveable device in a first or a second manner, based upon the rate of adjustment by the operator.

BACKGROUND OF THE INVENTION

A number of known control arrangements regulate the position or elevation of implements, such as plows, attached to or drawn by agricultural vehicles, such as tractors. Such control systems generally sense the position of a three-point hitch or other implement positioning structure and compare this position to a command value set by an operator using a command device. Based upon this comparison, such control systems generate a control signal for an actuator to vertically move the hitch, along with the implement mounted on it, to the desired elevation.

Known control systems can also operate based upon the draft or load force generated by the interaction of an implement with the ground. Such draft force can be generated by the implement penetrating the ground, or by the implement being engaged with the ground. The control system typically compares the sensed draft force to a command value set by an operator and generates a control signal for an actuator to vertically move the hitch to maintain the desired draft force.

When the position of a hitch is controlled based upon a comparison between the actual hitch position and a commanded position, the motion of the hitch which occurs as a result of the operator changing the commanded position depends on several factors. The factors include the weight of the implement, the desired drop or raise rate of the actuator which may be adjusted by the operator using a drop or raise rate knob or device, and the actual movement of the device used by the operator to set the command value.

Known control systems, however, may experience a problem which causes discontinuous or jerky movement of the implement, and decreases the precision with which the motion and position of the implement are controlled. The problem may be particularly troublesome when the implement being controlled is relatively heavy and the movement commanded by the operator is relatively small. The problem occurs because, once the actuator or valve feeding the actuator with pressurized fluid begins to respond to a change in the position command device, the implement drops or rises quickly before the control system gains control over the implement. Once control is attained, the implement may have already dropped or risen beyond the small distance commanded by the operator, thereby resulting in a jerk and imprecise positioning.

SUMMARY OF THE INVENTION

Accordingly, the present invention provides an improved system capable of precisely controlling the motion of an implement, particularly when the implement is heavy and the commanded movement is small. The invention also provides a system with a precision control mode wherein the control signals for moving the implement are generated in a different manner than in the normal mode of operation. The invention also provides a system which overrides the normal drop or raise rate of an actuator with a slower rate based upon an operator input.

To avoid burdening the user with another task, the invention preferably provides a system which automatically switches between control modes without requiring the user to expressly select the appropriate mode. To avoid the added costs and decreased reliability associated with additional operator input devices, the invention also preferably provides a system which switches between two manners of operation without the need for additional input devices.

In accordance with one aspect, the invention relates to a system for controlling a function of a machine system comprising an off-road work vehicle, a moveable device adapted to perform the function and a positioning assembly coupled to the vehicle and including an actuator for moving the moveable device in response to a control signal. The control system includes an operator-adjustable input device configured to generate an input signal, and a control circuit coupled to the input device and the actuator. The control circuit is configured to determine a rate of change of the input signal and to generate the control signal for moving the moveable device in either a first manner or a second manner depending upon the rate of change of the input signal.

In accordance with another aspect, the invention relates to a system for controlling a function of a machine system comprising an off-road work vehicle, a moveable device adapted to perform the function and a positioning assembly coupled to the vehicle and including an actuator for moving the moveable device in response to a control signal. The control system includes a sensor assembly configured to detect a parameter of the machine system and to generate signals representative thereof, an operator-adjustable command device configured to generate a command signal, and a control circuit coupled to the sensor assembly, the command device, and the actuator. The control circuit is configured to determine an error value based upon a difference between the sensed parameter signal and the command signal and to determine a rate of change of the command signal. The control circuit is also configured to generate the control signal for moving the moveable device based at least upon the error value in either a first manner or a second manner depending upon the rate of change of the command signal.

The invention also relates to a system for controlling the elevation of an implement carried or trailed by a work vehicle. The implement is coupled to an implement positioning assembly including an actuator configured to selectively raise and lower the implement in response to control signals. The system includes a position sensor configured to detect the position of the implement and to generate signals representative thereof, an operator-adjustable command device configured to generate a command signal, and a control circuit coupled to the position sensor, the command device, and the actuator. The control circuit is configured to determine an error value based upon a difference between the sensed position signal and the command signal and to determine a rate of change of the command signal. The control circuit is also configured to generate the control signal for moving the implement based at least upon the error value in a first manner when the rate of change of the command signal is less than a threshold value and in a second manner when the rate of change exceeds the threshold value.

In accordance with yet another aspect, the invention relates to a system for controlling the elevation of an implement carried or trailed by a work vehicle. The implement is coupled to an implement positioning assembly including an actuator configured to selectively raise and lower the implement in response to control signals. The system includes a position sensor configured to detect the position of the implement and to generate signals representative thereof, an operator-adjustable command device configured to generate a position command signal, an operator-adjustable input device configured to generate an input signal having a first state and a second state, and a control circuit coupled to the position sensor, the command device, the input device, and the actuator. The control circuit is configured to determine an error value based upon a difference between the sensed position signal and the position command signal and to generate the control signal for moving the implement based at least upon the error value. The control circuit is also configured to limit rate of movement of the actuator to a first movement rate when the input signal is in the first state, and to override the first movement rate with a slower movement rate when the input signal is in the second state.

The invention also relates to a method of controlling the elevation of an implement carried or trailed by a work vehicle. The implement is coupled to an implement positioning assembly including an actuator configured to selectively raise and lower the implement in response to control signals. The method includes the steps of monitoring an input signal from an operator-adjustable command device, determining the rate of change of the input signal, and generating the control signals for moving the implement based at least upon the rate of change of the input signal.

BRIEF DESCRIPTION OF THE DRAWINGS

The invention will become more fully understood from the following detailed description, taken in conjunction with the accompanying drawings, wherein like reference numerals refer to like parts, in which:

FIG. 4 is a flow-chart generally representing typical control logic used in the normal position control logic executed by the controller shown in FIG. 1.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to a tractor having a hitch assembly on which an implement is mounted, it should be understood that the present system is more generally applicable to control systems for work vehicles in general. Thus, a system employing the elements recited in the appended claims, though used with other types of vehicles and/or for performing other functions, is equally within the intended scope of the invention.

Figure 1:
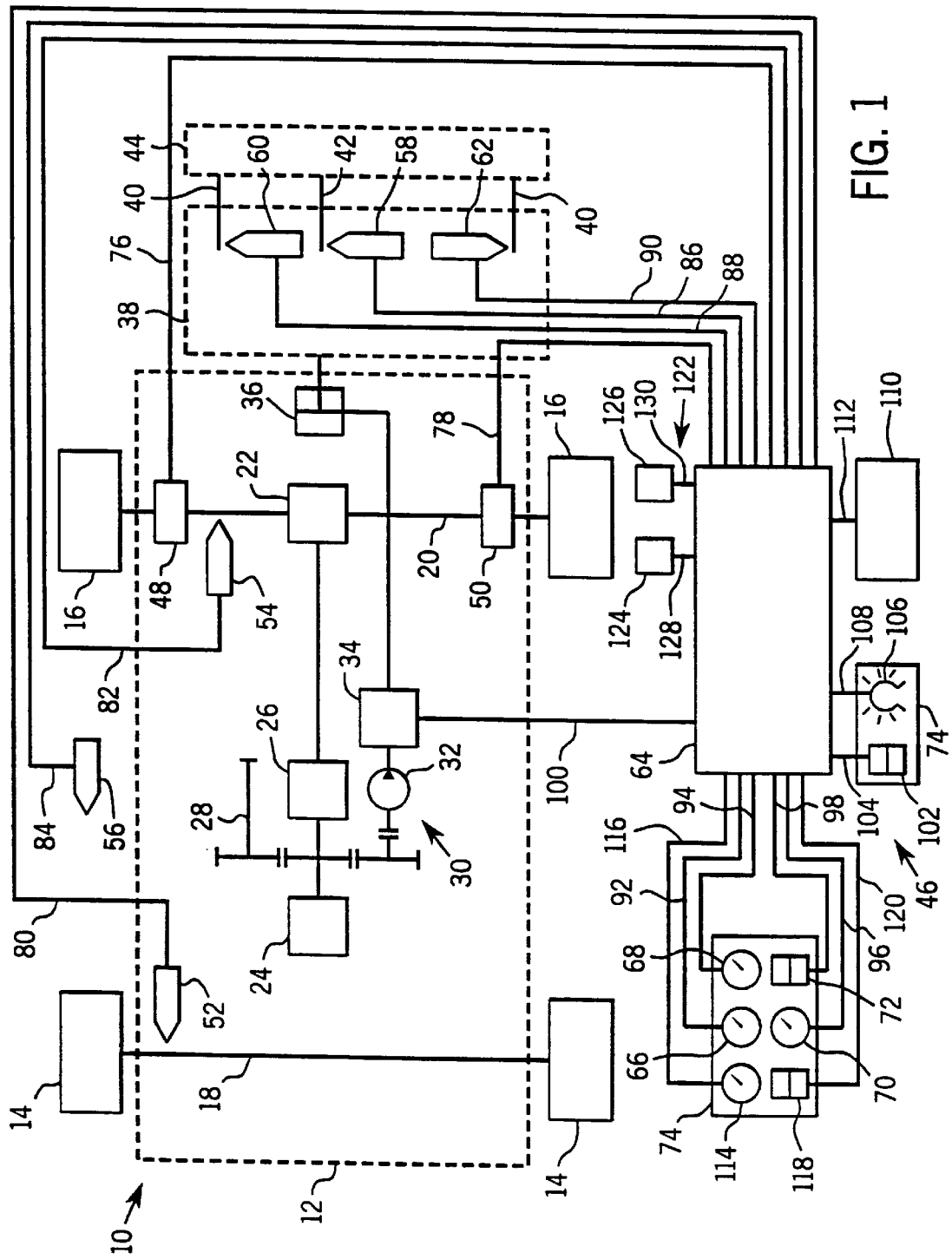
FIG. 1 is a diagrammatical representation of a tractor equipped with a control system for positioning an implement in response to a plurality of operating parameters including implement position and load.

Turning now to the FIGURES and referring first to FIG. 1, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment. A tractor generally of this type is further described in U.S. Pat. No. 5,421,416 incorporated herein by reference.

A hydraulic system 30 is coupled to engine 24 to provide a source of pressurized fluid for powering various actuators. As illustrated in FIG. 1, hydraulic system 30 includes a hydraulic pump 32 piped to a fluid reservoir (not shown) and to valve assembly 34 for regulating and directing pressurized fluid to various hydraulic components, such as a linear actuator, single-acting or double-acting cylinder 36 coupled to a hitch assembly 38. Hitch assembly 38 may be a conventional three-point hitch having lower and upper hitch links 40 and 42 for supporting a working implement 44, such as a plow. Moreover, valve assembly 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked. Valve assembly 34 can also be used to raise hitch assembly 38, along with implement 44, to a lifted position wherein the implement is not engaged in a working position with the ground. A lifted position may typically be commanded by the operator or control system during travel of tractor 10 across a road or between fields.

As illustrated in FIG. 1, tractor 10 is equipped with a control system, designated generally by the reference numeral 46 for controlling the position of hitch assembly 38 and implement 44. While control system 46 may include more or fewer of the elements shown in FIG. 1, it may typically include brake sensors 48 and 50 coupled to the rear service brakes of tractor 10, speed sensors 52 and 54 coupled to the front and rear axles 18 and 20, respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70, 72, 102, 114 and 118 (described below) which may be provided on a single or multiple control consoles 74 in the tractor cab. Control system 46 also includes one or more devices to display status or parameter information to the operator, such as a lamp 106 and a display 110 (described below).

In operation, brake sensors 48 and 50 detect the application of the tractor service brakes and generate braking signals upon application of the brakes. These braking signals are applied to control circuit 64 via conductors 76 and 78, respectively. Of course, for control systems employing control routines that do not make use of braking signals, sensors 48 and 50 may be omitted. Speed sensors 52 and 54, which may include a variable inductance magnetic pickup sensor, detect the rotational velocity of front wheels 14 and rear wheels 16, respectively, and generate signals representative thereof. These speed signals are transmitted to control circuit 64 via conductors 80 and 82. A tractor 10 may also include a ground speed sensor 56 to measure the true speed of tractor 10 with respect to the ground. Sensor 56 typically includes a radar device mounted to body 12 of tractor 10 which emits radar signals toward the ground and receives a portion of the signals rebounding from the ground to determine the ground speed. Sensor 56 then generates a speed signal representative of the tractor speed and transmits this signal to control circuit 64 via conductor 84. Alternatively, ground speed sensor 56 could include a receiver for receiving sequential signals from a satellite positioning system such as the Global Positioning System (GPS), with the ground speed equal to the change between sequential positions divided by the elapsed time. Speed sensor 52 could also be used to measure ground speed since it senses the rate of rotation of a non-driven front wheel 14 of tractor 10.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, other, additional sensors may be provided on tractor 10 for use in additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 with respect to body 12, and generates a position signal representative thereof. This position signal is conveyed to control circuit 64 via a conductor 86. Draft load sensors 60 and 62, which typically include resistance strain gauges applied to links 40 of hitch assembly 38, generate draft load signals representative of the force exerted on links 40. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40. When tractor 10 is stopped and implement 44 is in a lifted position, the load sensed by sensors 60 and 62 is related to the weight of the implement.

In addition to sensed values of the operating parameters discussed above, control circuit 64 receives command or reference values from command devices 66, 68, 70, 72, 114 and 118, which typically include switches and potentiometers positionable via suitable knobs or handles (not shown). For the purposes of implement position control, command device 66 provides an implement position command signal representative of the desired position of implement 44. Command device 68 provides a draft command value representative of the desired level of draft force on implement 44. Command device 70 is an operator-adjustable upper limit selector for setting the maximum allowable raised physical position of hitch assembly 38, hereinafter referred to as the upper limit, beyond which control system 46 may not move assembly 38. Command device 72 is an implement position override switch that includes an UP position, a DOWN position and a spring-biased momentary DOWN position accessible from the DOWN position. Command device 114 is an operator-adjustable drop rate device for setting a desired drop rate of actuator 36. Finally, command device 118 is an optional drop rate override switch that includes a first position in which control circuit 64 uses the drop rate set by command device 114, and a second position in which the drop rate is overridden as described below.

Although the foregoing command devices are preferred, a given control system may not use every command device described above, and other command devices may provide other inputs for control of various functions of tractor 10. For example, control system 46 may also include an operator-adjustable raise rate command device for setting a desired raise rate of actuator 36 independently of drop rate command device 114. The raise rate set by this command device could also be overridden by an optional override switch. The drop rate and raise rate command device s may be referred to as rate of movement devices. Control system 46 may also include a travel knob or response rate knob as described in U.S. Pat. No. 5,421,416, mentioned above.

Signals from devices 66, 68, 70, 72, 114 and 118 are applied to control circuit 64 via conductors 92, 94, 96, 98, 116 and 120, respectively. Based upon the command or reference values supplied by command devices 66, 68, 70, 72, 114 and 118, and upon the sensed values from sensors 48 through 62, control circuit 64 generates control signals for raising and lowering implement 44 and applies these control signals to valve assembly 34 via conductor 100 to move actuator 36.

In a control system equipped for slip control, control circuit 64 also receives a command from command device 102. Command device 102 is used for turning a slip control function on and off and for setting a slip limit. Command device 102 is preferably a three-position rocker switch selectively movable between OFF, ON and SET positions. The SET position of command device 102 is accessible from the ON position and is a momentary position maintained as long as the operator holds command device 102 in the SET position. A signal indicative of the position of command device 102 is applied to control circuit 64 via conductor 104. The slip control system also includes a slip indicator lamp 106. Lamp 106 is activated by a signal supplied by control circuit 64 via conductor 108 when a slip control override function is engaged to raise hitch assembly 38 to reduce wheel slip to a desired range.

Control system 46 may also include a display 110 controlled by control circuit 64 via conductor 112. Display 110 may be adapted to display various parameters or conditions in a manner known in the art.

Control system 46 also includes a remote switch assembly 122 for commanding elevational movements of hitch assembly 38. Remote switch assembly 122 preferably includes a pair of remote momentary switches 124 and 126 fender-mounted near the rear of tractor 10. Remote switches 124 and 126 are momentary UP and DOWN switches coupled to control circuit 64 via conductors 128 and 130, respectively. Switches 124 and 126 could be replaced with an appropriate single switch.

While in the foregoing description of control system 46 the various sensors and command devices are shown coupled directly to circuit 64, other system structures and architectures may be used. For example, control circuit 64 may be one of several peer, master or slave controllers provided on vehicle 10 for different subsystems, such as PTO operation, an operator's console, transmission operation and the like. In such cases, control circuit 64 may be coupled to other controllers via a communications databus and some or all of the sensors and command devices needed to carry out the functions of control circuit 64 may be assigned and interfaced directly with other controllers on the vehicle. The various parameter signals needed by control circuit 64 could be communicated to control circuit 64 via the communications databus and circuit 64 would include communications interface circuitry adapted to recognize and record necessary signals from the databus. Moreover, circuit 64 may be adapted to output control signals via the communications databus to be received by other system controllers such that the control functions are executed by such other system controllers.

Figure 2:
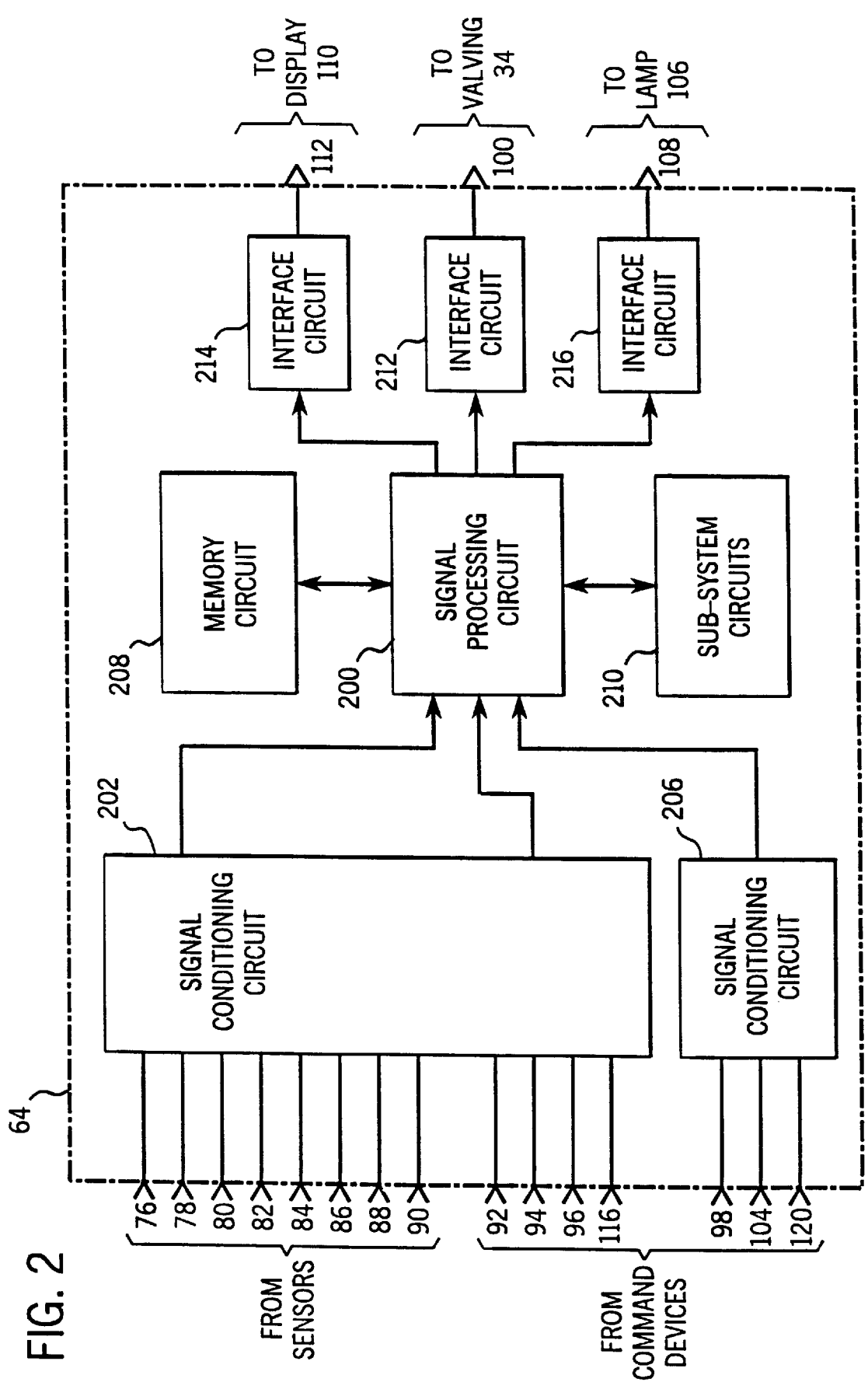
FIG. 2 is a block diagram illustrating certain of the principle circuits included in the controller for the system shown in FIG. 1.

Certain of the sub-circuits included in control circuit 64 are illustrated diagrammatically in FIG. 2. Control circuit 64 includes a signal processing circuit 200 coupled to a number of other circuits including signal conditioning circuits 202 and 206, a memory circuit 208, one or more subsystem circuits 210 including circuits such as a response signal generating circuit or an initialization circuit, and output signal interface circuits 212, 214 and 216. While these various circuits are illustrated in FIG. 2 as separate, interconnected elements, it should be understood that all or some of these circuits may be included in a single integrated circuit and may comprise internal circuitry of an appropriately configured or programmed microprocessor.

Input signals transmitted from sensors and command devices to control circuit 64 via conductors 76 through 96 and 116 are applied to signal processing circuit 200 through signal conditioning circuit 202, which typically includes an analog-to-digital converter circuit and appropriate isolation, depending upon the type of sensors and command devices utilized and the nature of the signals produced. More than one analog-to-digital converter may be used to increase the conversion bandwidth. Circuit 202 receives the input signals from the sensors and command devices, produces digital signals or values representative of the various input signals and applies these values to signal processing circuit 200. Circuit 206 receives command input signals from other command devices via conductors 98, 104 and 120, which are generally discrete (e.g., on/off) signals for controlling operation of signal processing circuit 200. Circuit 206 typically includes a multiplexer and appropriate isolation, permitting signal processing circuit 200 to select and access signals applied to circuit 206.

Memory circuit 208, which may include several different memory modules, preferably includes both volatile and non-volatile memory, such as random access memory (RAM), electronically programmable read only memory (EPROM), electronically erasable programmable read only memory (EEPROM) and flash memory. The volatile memory of circuit 208 is generally used to store various parameter and intermediate values used during the control functions of signal processing circuit 200. Non-volatile memory, such as flash memory or EPROM, serves to store the cyclic control routine implemented by signal processing circuit 200, while other non-volatile memory, such as EEPROM, serves to store the calibration values and failure signals indicative of failure or non-responsiveness of system components.

Other subsystem circuits 210, such as a response signal generating circuit or an initialization circuit, may be included in the circuitry of signal processing circuit 200, but are illustrated separately here for explanatory purposes. The response signal generating circuit receives values representative of sensed implement position and sensed implement draft or load and generates a response signal to control the movement of implement 44. The response signal is applied to signal processing circuit 200 to adjust control signals generated by circuit 200. The adjusted control signals, in the form of pulse-width-modulated (PWM) output signals, are applied to output signal interface circuit 212. Circuit 212 includes appropriate valve drivers for energizing the solenoids of valve assembly 34, thereby moving actuator 36 in a desired direction and at a desired rate. The rate of movement of actuator 36 is preferably proportional to the duty cycle of the control signals. The adjusted control signals produced by circuit 200 could have forms other than PWM signals and, where actuators other than hydraulic cylinders and the like are used for moving the implement, these control signals are adapted for the particular actuator used.

circuit 200 also produces a control signal applied to interface circuit 216 which generates an output signal coupled to lamp 106 via conductor 108 to provide on/off control of lamp 106. In addition, circuit 200 produces a control signal applied to interface 214 which drives display 110 via conductor 112.

Generally, automatic control of the position or elevation of implement 44 is carried out as follows. Control circuit 64 monitors the command or reference values for implement position and draft force set by command devices 66 and 68, respectively. These values are filtered and compared to sensed position and draft force values read from sensors 58, 60 and 62 according to a cyclic control routine. A number of such routines, following a variety of control schemes, are known in the art and do not, in themselves, form part of the present invention. While different manufacturers may utilize different control routines, depending upon the type and class of vehicle being controlled and upon the parameters governing implement movement, these routines typically generate control signals for moving the implement up or down depending upon the deviation of the sensed values of at least the draft force and implement position from the reference values for these parameters. Moreover, these routines may select the greater of two or more parameter error values or combine two or more parameter error values to generate the implement control signals. Most known systems of this type ultimately generate control signals in the form of PWM signals, the duty cycle of which is proportional to the error signal forming the basis for control. These PWM signals are then applied, through an appropriate valve driver, to the solenoid coil of a proportional hydraulic valve to raise or lower the implement at a rate proportional to the PWM control signal duty cycle. A control system which executes a control routine such as the above is described in U.S. Pat. No. 5,421,416, mentioned above.

Figure 3:
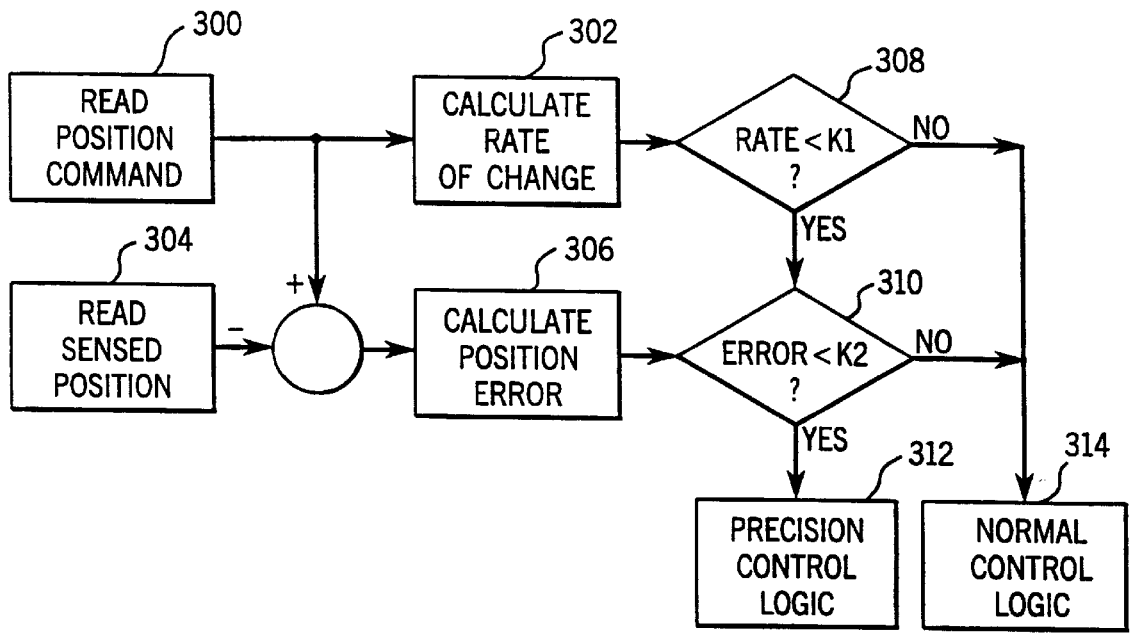
FIG. 3 is a block diagram generally representing typical control logic used to select between normal position control logic and precision position control logic.
Figure 6:
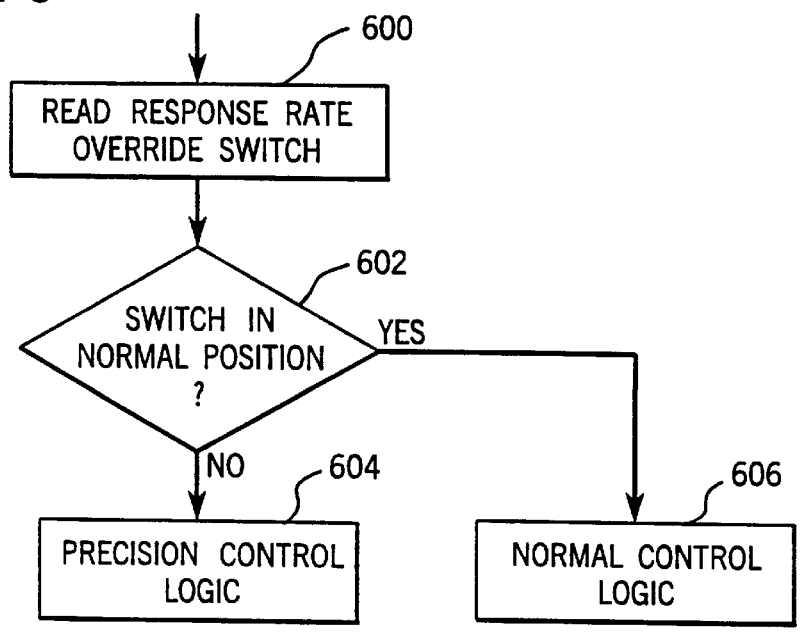
FIG. 6 is a flow-chart generally representing alternative control logic used to select between normal position control logic and precision position control logic.

As shown generally in FIG. 3, control circuit 64 may control the position of implement 44 in either a normal mode of operation or a precision mode of operation. As described below, the drop or raise rate or rate of movement of implement 44 in the precision control mode is generally slower than the rate that would be commanded in the normal positioning mode. The slower rate of movement used in the precision control mode enables smooth and precise positioning of implement 44 in response to relatively small changes in commanded position.

At steps 300 and 302, control circuit 64 reads the position command signal from command device 66 and calculates the rate of change (i.e., derivative) of the position command signal. As will be appreciated by those skilled in the art, circuit 64 generates this position command time derivative by calculating the difference between the current and previous position command signals and dividing by the elapsed time (e.g., 10 msec). The position command signal may represent a reference position signal set by the operator using command device 66. Alternatively, when command device 72 is in the UP position or the reference position setting of command device 66 is beyond the upper limit, the position command signal may represent the upper limit signal set by the operator using command device 70. At steps 304 and 306, control circuit 64 reads the sensed position from position sensor 58 and calculates a position error value equal to the difference between the commanded and sensed position values. At steps 308 and 310, control circuit 64 determines whether to execute the normal or precision control algorithm. If the position command derivative is below a constant K1 (a difference delta) and the position error is below a constant K2 (a position error delta), control circuit 64 controls the position of implement 44 using a precision control mode 412 instead of a normal control mode 414. K1 and K2 may, for example, equal 5 and 50 counts, respectively, in a control system using 12-bit digitized input values.

FIG. 4 generally represents the position control logic used to control the position of implement 44. At steps 400 through 406, control circuit 64 reads input values associated with the position control logic. These values include a position command from command device 66, an upper limit value from command device 70, a sensed position from position sensor 58 and a drop rate value set by the operator using command device 114. The position command and upper limit values set travel limits for the position of implement 44. At step 408, control circuit 64 generates a position command line with a slope based upon the drop rate value. In a preferred embodiment, control circuit 64 digitizes the analog drop rate output from command device 114 and categorizes the value into one of ten drop rate ranges, designated as drop rate categories "1" through "10". For example, drop rate category "1" corresponds to a slow declining slope (e.g., 12 seconds for hitch assembly 38 to drop completely) while drop rate category "10" corresponds to a steep declining slope. Similar logic may be used to generate a position command line with a slope based upon a raise rate value.

At step 410, a position error value is calculated based upon the difference between the sensed position and the position command line. At step 412, control circuit 64 generates a control signal for actuator 36 based upon the position error value and the threshold current value for the respective lower or raise valve being commanded. The control signal is adjusted at step 414 to compensate for changes in battery voltage or temperature from the values present when the control system was calibrated, as described in U.S. Pat. No. 5,472,056, incorporated herein by reference. At step 416, the corrected control signal is applied to actuator 36 to cause hitch assembly 38 to move elevationally at the desired rate.

Figure 5:
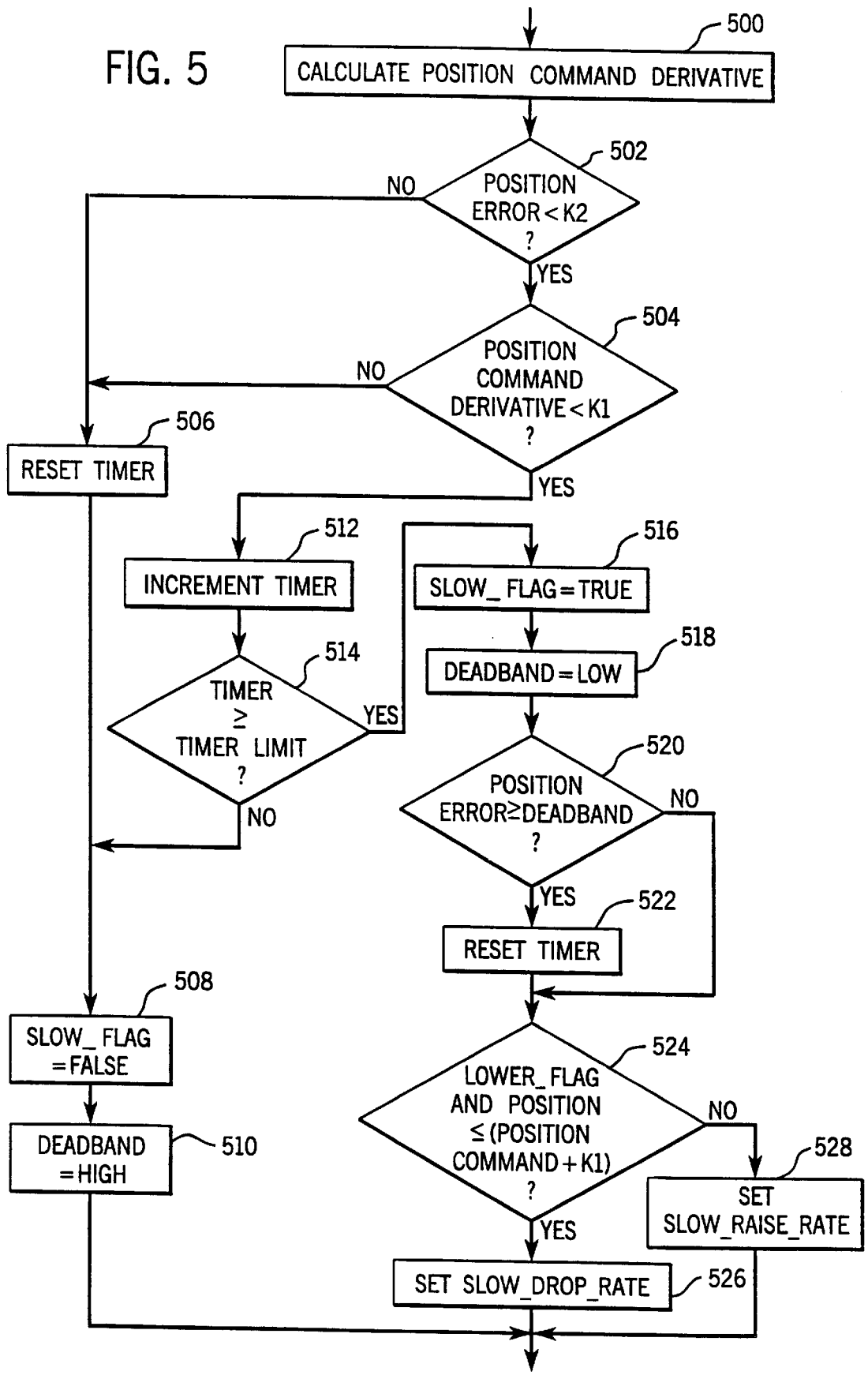
FIG. 5 is a flow-chart generally representing typical control logic used to override the drop or raise rate limit with a slow rate limit during the precision control manner of operation.

Although the normal and precision control logic is shown in separate blocks in FIG. 3, control circuit 64 may implement the precision control logic by modifying or overriding the normal drop or raise rate limit set by command device 114 under certain conditions. Referring to FIG. 5, control circuit 64 calculates the derivative of the position command signal at step 500. At steps 502 through 510, if the position error is not below constant K2, or the position command derivative is not below constant K1, control circuit 64 resets a timer used to prevent erroneous transitions to precision control mode, resets a flag (SLOW_FLAG=FALSE) to indicate that precision control mode is not active, and sets a deadband value used to detect changes in the position command to a relatively high value (e.g., 10 counts in a 12-bit system). Otherwise, at steps 512 and 514, control circuit 64 increments the timer and branches to step 508 if the conditions for entering precision control mode have not existed for a certain time period. At steps 516 and 518 (executed once the timer reaches a time limit), control circuit 64 indicates that precision control mode is active (SLOW_FLAG=TRUE), and sets the deadband value to a relatively low value (e.g., 4 counts). The low deadband value increases the sensitivity of control system 46 to small changes in the position command during the precision control mode. At steps 520 and 522, the slow mode timer is reset when the position error value is less than the deadband value in order to reset conditions once the precision control mode is complete. At steps 524–528, control circuit 64 overrides the normal drop or raise rate limit using a slow drop rate value or a slow raise rate value depending on the direction in which implement 44 is being moved. For example, the normal drop rate may be overridden by a drop rate of "0", corresponding to a slowly declining slope (e.g., 20 seconds for hitch assembly 38 to drop completely) wherein hitch assembly 38 drops at a slower rate than in drop rate "1". When implement 44 is being raised, the normal raise rate may be overridden by a slow increasing slope value, such as raise rate "0". Alternatively, the normal drop or raise rate could be overridden in the precision control mode by a rate proportional to the rate of change of the position command signal.

Alternatively, control system 46 may include a separate input to select between normal and precision position control logic. The logic executed by control circuit 64 in such a system is shown in FIG. 7. At step 600, control circuit 64 reads the drop (or raise) rate override switch input from command device 118. At steps 602 through 606, control circuit 64 executes normal position control logic if switch 118 is in the normal position, and overrides the drop (or raise) rate limit as described above in relation to the precision control logic otherwise. Although command device 118 is described herein as a switch, command device 118 could be an analog input device such as a potentiometer. In this case, control circuit 64 could determine the state of command device 118 by comparing the analog input value with a threshold value. This alternative control system, in contrast to the system described in relation to FIG. 3 above, requires an extra input device 118 and requires the operator to expressly select the precision control algorithm when the slow rate of movement is desired.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flowcharts only generally represent the steps used by the control system. Different implementations of hardware and software that fall within the scope of the appended claims would be apparent to a person of skill in the art.

What is claimed is:

1. A system for controlling a function of a machine system comprising an off-road work vehicle, a moveable device adapted to perform the function and a positioning assembly coupled to the vehicle and including an actuator for moving the moveable device in response to a control signal, the control system comprising:

an operator-adjustable input device configured to generate an input signal; and a control circuit coupled to the input device and the actuator, the control circuit configured to determine a rate of change of the input signal and to generate the control signal for moving the moveable device in either a first manner or a second manner depending upon the rate of change of the input signal;

wherein the control circuit is configured to generate the control signal in the first manner when the rate of change of the input signal is less than a threshold value and in the second manner when the rate of change exceeds the threshold value;

wherein, when operating in the first manner, the control circuit is configured to generate the control signal such that the rate of movement of the actuator is slower than the rate of movement would have been if the control circuit was operating in the second manner.

2. The system of claim 1 wherein, when the control circuit is operating in the first manner, the rate of movement is limited to a predetermined value.

3. A system for controlling a function of a machine system comprising an off-road work vehicle, a moveable device adapted to perform the function and a positioning assembly coupled to the vehicle and including an actuator for moving the moveable device in response to a control signal, the control system comprising:

an operator-adjustable input device configured to generate an input signal; and a control circuit coupled to the input device and the actuator, the control circuit configured to determine a rate of change of the input signal and to generate the control signal for moving the moveable device in either a first manner or a second manner depending upon the rate of change of the input signal;

further comprising an operator-adjustable rate of movement device configured to generate signals representative of a desired rate of movement of the actuator, wherein, when operating in the first manner, the control circuit is configured to generate the control signal such that the rate of movement of the actuator is limited to a predetermined value and, when operating in the second manner, the rate of movement is limited to the desired rate of movement.

4. The system of claim 3 wherein the predetermined rate of movement is slower than any desired rate of movement which may be selected by the operator.

5. A system for controlling a function of a machine system comprising an off-road work vehicle, a moveable device adapted to perform the function and a positioning assembly coupled to the vehicle and including an actuator for moving the moveable device in response to a control signal, the control system comprising:

a sensor assembly configured to detect a parameter of the machine system and to generate signals representative thereof;

an operator-adjustable command device configured to generate a command signal; and a control circuit coupled to the sensor assembly, the command device, and the actuator, the control circuit configured to determine an error value based upon a difference between the sensed parameter signal and the command signal and to determine a rate of change of the command signal, the control circuit also configured to generate the control signal for moving the moveable device based at least upon the error value in either a first manner or a second manner depending upon the rate of change of the command signal;

wherein the control circuit is configured to generate the control signal in the first manner when the rate of change of the command signal is less than a threshold value and in the second manner when the rate of change exceeds the threshold value;

wherein, when operating in the first manner, the control circuit is configured to generate the control signal such that the rate of movement of the actuator is slower than the rate of movement would have been if the control circuit was operating in the second manner.

6. The system of claim 5 wherein, when the control circuit is operating in the first manner, the rate of movement is limited to a predetermined value.

7. A system for controlling a function of a machine system comprising an off-road work vehicle, a moveable device adapted to perform the function and a positioning assembly coupled to the vehicle and including an actuator for moving the moveable device in response to a control signal, the control system comprising:

a sensor assembly configured to detect a parameter of the machine system and to generate signals representative thereof;

an operator-adjustable command device configured to generate a command signal; and a control circuit coupled to the sensor assembly, the command device, and the actuator, the control circuit configured to determine an error value based upon a difference between the sensed parameter signal and the command signal and to determine a rate of change of the command signal, the control circuit also configured to generate the control signal for moving the moveable device based at least upon the error value in either a first manner or a second manner depending upon the rate of change of the command signal;

further comprising an operator-adjustable rate of movement device configured to generate signals representative of a desired rate of movement of the actuator, wherein, when operating in the first manner, the control circuit is configured to generate the control signal such that the rate of movement of the actuator is limited to a predetermined value and, when operating in the second manner, the rate of movement is limited to the desired rate of movement.

8. The system of claim 7 wherein the predetermined rate of movement is slower than any desired rate of movement which may be selected by the operator.

9. A system for controlling the elevation of an implement carried or trailed by a work vehicle, the implement coupled to an implement positioning assembly including an actuator configured to selectively raise and lower the implement in response to control signals, the system comprising:

a position sensor configured to detect the position of the implement and to generate signals representative thereof;

an operator-adjustable command device configured to generate a command signal; and a control circuit coupled to the position sensor, the command device, and the actuator, the control circuit configured to determine an error value based upon a difference between the sensed position signal and the command signal and to determine a rate of change of the command signal, the control circuit also configured to generate the control signal for moving the implement based at least upon the error value in a first manner when the rate of change of the command signal is less than a threshold value and in a second manner when the rate of change exceeds the threshold value;

wherein, when operating in the first manner, the control circuit is configured to generate the control signal such that the rate of movement of the actuator is slower than the rate of movement would have been if the control circuit was operating in the second manner.

10. The system of claim 9 wherein, when the control circuit is operating in the first manner, the rate of movement is limited to a predetermined value.

11. A system for controlling the elevation of an implement carried or trailed by a work vehicle, the implement coupled to an implement positioning assembly including an actuator configured to selectively raise and lower the implement in response to control signals, the system comprising:

a position sensor configured to detect the position of the implement and to generate signals representative thereof;

an operator-adjustable command device configured to generate a command signal; and a control circuit coupled to the position sensor, the command device, and the actuator, the control circuit configured to determine an error value based upon a difference between the sensed position signal and the command signal and to determine a rate of change of the command signal, the control circuit also configured to generate the control signal for moving the implement based at least upon the error value in a first manner when the rate of change of the command signal is less than a threshold value and in a second manner when the rate of change exceeds the threshold value;

further comprising an operator-adjustable rate of movement device configured to generate signals representative of a desired rate of movement of the actuator, wherein, when operating in the first manner, the control circuit is configured to generate the control signal such that the rate of movement of the actuator is limited to a predetermined value and, when operating in the second manner, the rate of movement is limited to the desired rate of movement.

12. The system of claim 11 wherein the predetermined rate of movement is slower than any desired rate of movement which may be selected by the operator.

* * * * *